(12) United States Patent
Boothe et al.

(10) Patent No.: US 7,771,635 B2
(45) Date of Patent: Aug. 10, 2010

(54) MELT COOLER AND VALVING SYSTEM FOR AN UNDERWATER PELLETIZING PROCESS

(75) Inventors: Duane A. Boothe, Clifton Forge, VA (US); J. Wayne Martin, Buchanan, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 0 days.

(21) Appl. No.: 11/785,252

(22) Filed: Apr. 16, 2007

(65) Prior Publication Data

US 2007/0284771 A1    Dec. 13, 2007

Related U.S. Application Data

(60) Provisional application No. 60/793,222, filed on Apr. 20, 2006.

(51) Int. Cl.
*B29B 13/00* (2006.01)
*B29B 9/00* (2006.01)

(52) U.S. Cl. ............... 264/176.1; 264/209.7; 425/378.1; 425/67; 425/311; 425/313; 165/177; 165/178

(58) Field of Classification Search ............... 425/378.1, 425/67, 311, 313, 72.2, 131.1, 182, 308, 425/382.4, 461; 264/176.1, 172.17, 209.7, 264/211.1, 211.2, 639; 165/177, 178, 61, 165/137; 137/625, 596, 596.12, 625.5, 240, 137/625.47, 625.17, 625.29, 625.42
See application file for complete search history.

(56) References Cited

U.S. PATENT DOCUMENTS

| | | | |
|---|---|---|---|
| 2,644,195 A * | 7/1953 | Bennes et al. ............ | 264/37.26 |
| 3,251,408 A * | 5/1966 | Watson et al. ................. | 165/71 |
| 3,499,467 A * | 3/1970 | McCord et al. ......... | 137/625.19 |
| 3,896,029 A | 7/1975 | Beuselinck .................. | 210/341 |
| 3,940,222 A * | 2/1976 | Zink .......................... | 425/199 |
| 4,213,747 A * | 7/1980 | Friedrich .................... | 425/144 |
| 4,319,630 A * | 3/1982 | Hronek et al. ................ | 165/70 |
| 4,621,678 A | 11/1986 | Hahn et al. .................... | 165/27 |
| 5,190,706 A | 3/1993 | Knaus ....................... | 264/45.9 |
| 5,779,898 A * | 7/1998 | Schwanekamp et al. .... | 210/324 |
| 5,957,377 A * | 9/1999 | Inoue et al. ............. | 237/12.3 B |
| 6,041,819 A * | 3/2000 | Walleman ................ | 137/625.5 |
| 6,413,070 B1 * | 7/2002 | Meyering et al. ........... | 425/143 |
| 6,787,073 B1 | 9/2004 | Tadler et al. .................... | 264/5 |

FOREIGN PATENT DOCUMENTS

CA     2142944     10/2001

* cited by examiner

*Primary Examiner*—Philip C Tucker
*Assistant Examiner*—Dimple N Bodawala
(74) *Attorney, Agent, or Firm*—Jacobson Holman PLLC

(57) ABSTRACT

A melt cooler and valving system for an underwater pelletizer has a diverter valve that facilitates multiple modes of melt processing. The cooler has a cooler inlet line that conveys the melt to the cooler, and a cooler outlet line that conveys the cooled melt from the cooler. The diverter valve is configured to convey the melt to and from the cooler during a cooling mode of operation, to convey the melt around the cooler during a bypass mode of operation, and to drain the melt from the cooler and the diverter valve during a drain mode of operation. The diverter valve is compact and therefore contains a minimum of product inventory. The valve is streamlined and direct in its bypass mode, and includes a drain capability to allow for faster, easier cleaning of the process line, which in turn provides a fast changeover time with less lost product.

32 Claims, 19 Drawing Sheets

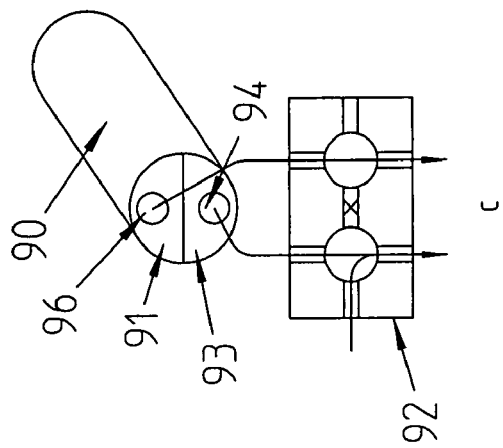
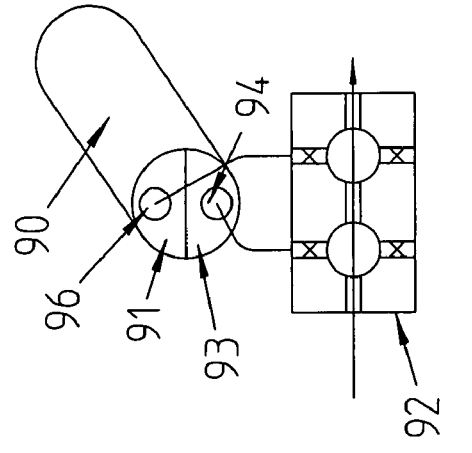
FIG. 8
X = FLOW PATH BLOCKED
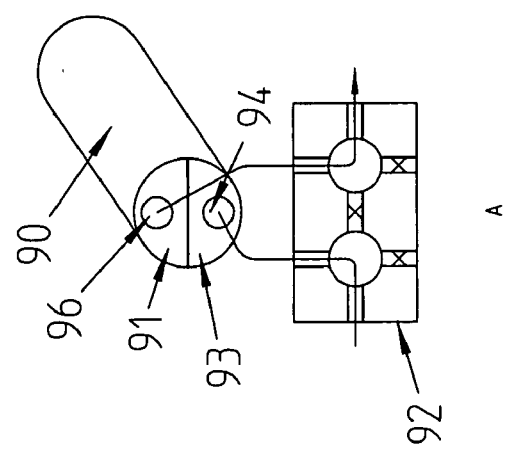

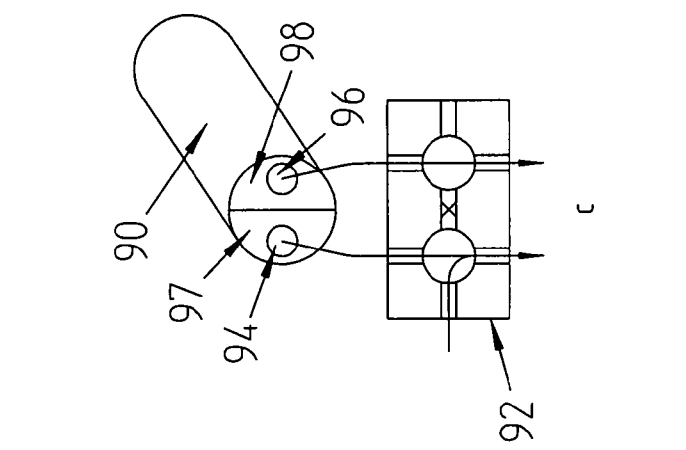
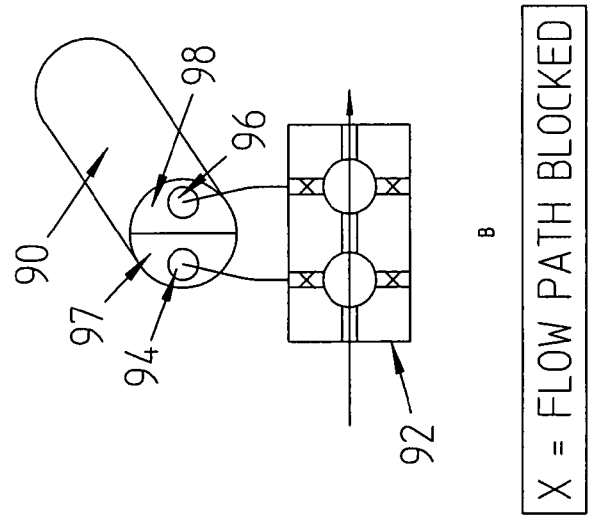
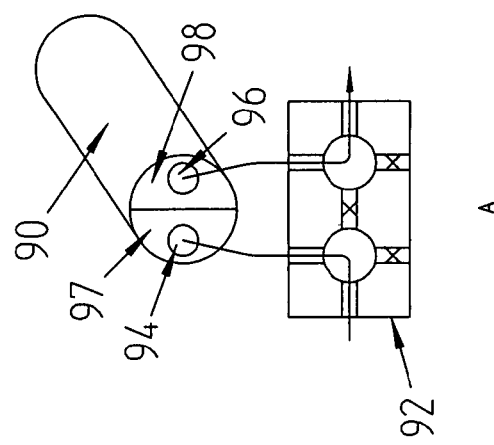
FIG. 9
X = FLOW PATH BLOCKED

VIEW FROM PUMP SIDE

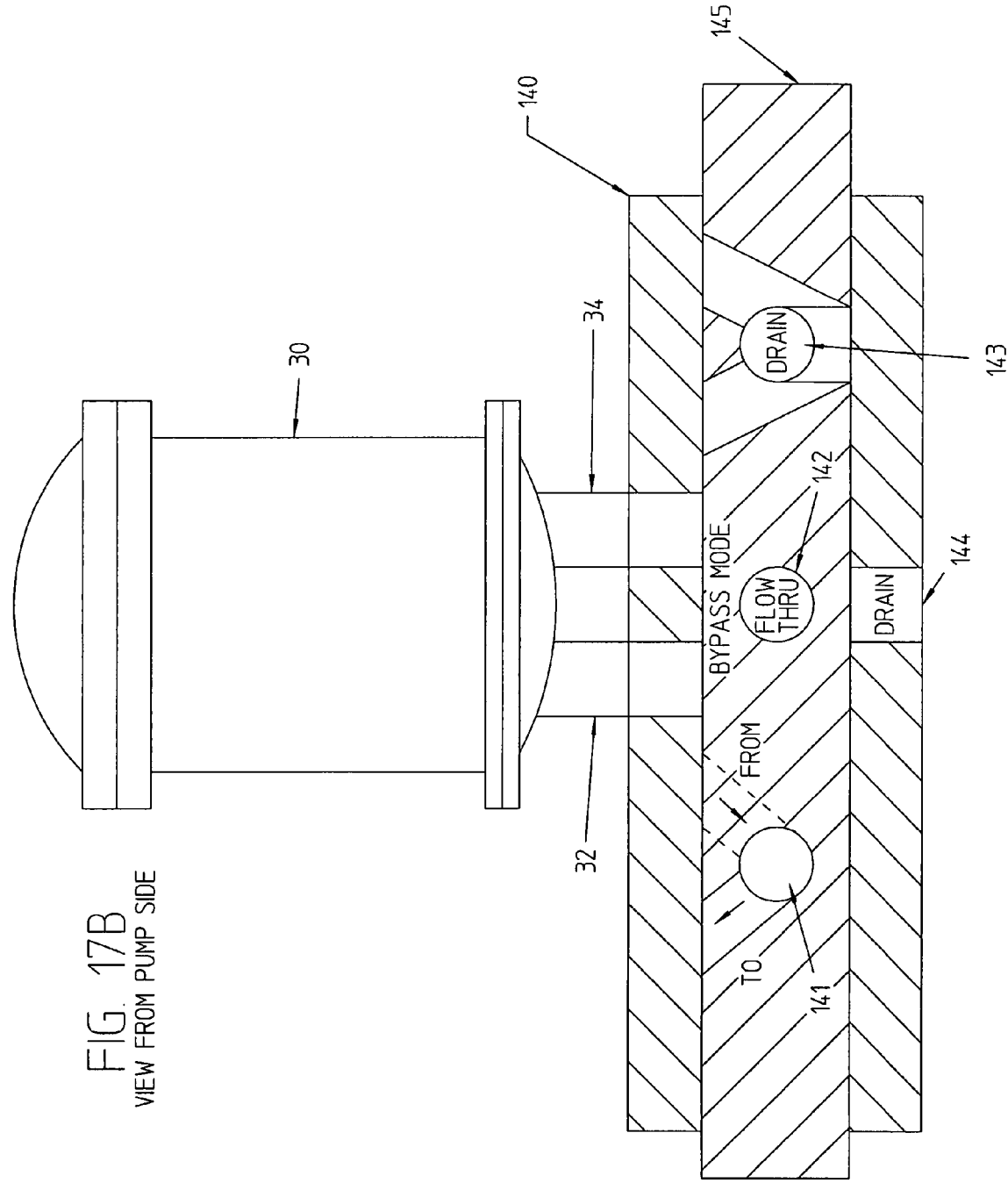

VIEW FROM PUMP SIDE

MELT COOLER AND VALVING SYSTEM FOR AN UNDERWATER PELLETIZING PROCESS

CROSS-REFERENCE TO RELATED APPLICATION

This application claims the benefit of priority to U.S. Provisional Application for Patent No. 60/793,222 filed Apr. 20, 2006.

BACKGROUND OF THE INVENTION

1. Field of the Invention

The present invention generally relates to underwater pelletizing equipment and a method of processing and pelletizing polymeric resins and similar materials. More specifically, the present invention relates to underwater pelletizing equipment and a method of processing and pelletizing polymeric resins and other extrudable materials in which the melt cooler and associated valving can be utilized to maximum efficiency for the different polymeric resins being processed and pelletized.

2. Description of the Prior Art

One known production process has been commonly used for many years for a broad array of hot melt and pressure sensitive adhesive products made from such polymer resins as ethylene vinyl acetates ("EVA"), polyethylenes ("PE"), polypropylenes ("PP"), thermoplastic elastomers ("TPE"), thermoplastic urethanes ("TPU"), polyesters and polyamides as their base ingredients, and as combined with many other materials, such as waxes, tackifiers, pigments, mineral fillers, antioxidants, etc. This known process has also been successfully applied to other non-adhesive products such as gum bases, varieties of chewing gum, and asphalts.

The aforementioned process can be applied to nearly any polymer application in which the product is made, blended, mixed, or compounded, usually at a relatively high temperature, and then which must be cooled considerably in order to have a more suitable condition just prior to passing through a die plate and then being cut into pellets. Pellets are the most common and desired form for the packaging, transporting, and subsequent handling, blending, melting, molding, and overall use of such aforementioned polymeric materials.

The aforementioned known production process generally consists of the following processing components, as shown in FIG. 1 of the accompanying drawings: reactor, mixing vessel or extruder 1; melt pump 2; filter 3; melt cooler with dedicated heat transfer fluid system 4; polymer diverter valve 5; die and pelletizer 6 (with optional bypass piping); tempered water system 7 (with optional water filtration equipment); water separator/dryer 8 (with optional pellet screening equipment); and conveying and/or packaging equipment 9.

The melt cooler 4 is basically a heat exchanger, of which there are many types, such as, for example, plate and frame, shell and tube, scraped wall, etc. The melt cooler 4 lowers the melt temperature of the polymer or extrusion product passing through the cooler. However, some types of melt coolers are more efficient than other types, with the primary focus being to most efficiently remove heat energy. But many other functional considerations are important to this component of the overall apparatus and method. For example, some of the considerations associated with the melt cooler include: minimizing pressure drop of the melt; process considerations associated with the elevated process temperatures and pressures; materials of construction considerations associated with the elevated process temperatures and pressures; ease of cleaning; minimizing floor space occupied by the cooler and piping; and providing the flexibility to either cool or heat a product, depending upon the specific processing service.

The aforementioned prior art process that is most commonly utilized has a melt cooler of a single pass shell and tube design combined with static mixer elements, as shown in FIG. 2. The melt cooler 10 shown in FIG. 2 achieves good results when working with either a specific product or with a wide variety of products. However, many polymer producers have a broad array of polymer products, including some products that need not be cooled prior to pelletizing. Thus, the step of pumping those particular products through the melt cooler not only may be unnecessary, but could also be undesirable or even problematic. So with this in mind, it has become desirable to have the flexibility to bypass the melt cooler when running certain grades of polymeric materials, and use the melt cooler for other types of materials.

One possible method of accomplishing the aforementioned bypass mode of operation is to remove the melt cooler from the process line. Removal of the melt cooler, however, requires both substantial labor and time to change out and/or to re-install. Removal of the melt cooler also requires special adapter plates for connecting the piping, along with short versions (i.e., for normal mode of operation) and long versions (i.e., for bypass mode of operation) of interconnecting wires and pipes. Removal of the melt cooler can also require special track or rail systems on the floor to guide the equipment out of and back into place. Optionally, a "spool" can be inserted in place of the melt cooler, i.e., to connect the piping upstream of the cooler with the piping downstream of the cooler. A spool is a straight large bore pipe with or without any coolant connection, so that adapters, wiring, or piping need not be changed so often.

Another prior art method of cooling is shown in FIG. 3. A diverter valve 20 is included in the process line upstream of the melt cooler 22 and routes the melt into a bypass line 24 running parallel to the melt cooler 22. Another valve 26 is installed downstream of the melt cooler 22 in order to return the product to the process line. One disadvantage of this option is that it requires a longer overall process line. Two additional high pressure valves 20 and 26 are also required, and a long hollow tube pipe is needed for the bypass line 24. The bypass line 24 also must be rated for high pressure and must be heated to maintain the temperature of the melt. The interior of bypass line 24 may also require static mixers, and line 24 will contain product inventory, which is a consideration for cleaning and changeover of the mode of operation.

SUMMARY OF THE INVENTION

In order to overcome the above-described drawbacks of the prior art melt coolers and related methods of operation, the present invention provides a melt cooler design that conserves space and minimizes product inventory, thus making it easier to clean and/or change over. The melt cooler and associated valving components are easily and quickly reconfigured to accommodate operation with products that require cooling and those that do not. In effect, a far more versatile, yet efficient melt cooler is provided for the known prior art production process described above, and for any of the many other materials or products being processed with this type of equipment.

The present invention also includes a diverter valve for use in conjunction with the melt cooler of this invention. The diverter valve is compact in its installation footprint and, therefore, contains a minimum of product inventory. The diverter valve is streamlined and direct in its bypass mode, thereby providing fast throughput of the melt. Additionally, the diverter valve has a drain capability that enables faster, easier cleaning of the process line, which in turn allows for faster changeover time with less lost product.

Another novel feature of the present invention is the utilization of a two-pass (or double-pass) type heat exchanger, preferably of the static mixer, shell and tube, design. In combination with the compact diverter valve, the two-pass heat exchanger provides for overall compactness of the linear process. The two-pass heat exchanger, having both its inlet and outlet on the same end or side, can be closely coupled to the diverter valve, thereby permitting its footprint relative to the floor space to be as small as possible. Drainage of the heat exchanger process line, when necessary, can be effected with the aforementioned diverter valve drains.

In a preferred embodiment of the invention, the two-pass melt cooler is mounted in a vertical orientation on the top of the diverter valve, with the cooler's inlet and outlet located on the bottom of the cooler. However, the melt cooler can be mounted in various orientations or angles relative to the center flow axis of the process line without departing from the invention. For example, according to another embodiment of the invention, the melt cooler is installed with its inlet and outlet at the top of the cooler, i.e., so that the cooler is mounted in a vertical orientation beneath the diverter valve. In this bottom-mount configuration, the diverter valve ports are reoriented and the drain mode of operation is not employed. However, the primary functions of melt cooling and process bypass are accomplished. Draining/cleaning of the melt cooler is accomplished by having one or more drain ports located on the bottom end of the melt cooler.

According to still another embodiment of the invention, the melt cooler is oriented horizontally, i.e., parallel to the orientation of the melt inlet and outlet piping. Thus, those skilled in the art will appreciate that the orientation of the melt cooler can be in various vertical or horizontal positions. Due to height limitations or due to interferences from neighboring equipment or from existing structural placements, the melt cooler can be mounted/installed on any of various angles between the vertical and horizontal positions.

An object of the present invention, therefore, is to provide a melt cooler and valving system that conserves space and minimizes product inventory, thus making it easier to clean and/or change over.

Furthermore, since the processing of polymeric materials entails operations with polymers having various process requirements, another object of the present invention is to provide a melt cooler valving system having components that are easily and quickly reconfigured to accommodate operation with those products that require cooling prior to pelletizing and those products that do not.

A further object of the present invention is to provide a compact diverter valve that is configured to convey the melt to and from the cooler during a cooling mode of operation, to convey the melt around the cooler during a bypass mode of operation, and to drain the melt from the cooler and from the diverter valve during a drain mode of operation.

Additionally, since certain polymeric materials may require heating prior to further processing, yet another object of the present invention is to provide a heat exchanger valving system having components that are easily and quickly reconfigured to accommodate both cooling and heating operations.

Still another object of this invention to be specifically enumerated herein is to provide a melt cooler and valving system of an underwater pelletizer in accordance with the preceding objects that will conform to conventional forms of manufacture, be of relatively simple construction and easy to use so as to provide a device that will be economically feasible, long lasting, durable in service, relatively trouble free in operation, and a general improvement in the art.

These together with other objects and advantages which will become subsequently apparent reside in the details of construction and operation as more fully hereinafter described and claimed, reference being had to the accompanying drawings forming a part hereof, wherein like reference numbers refer to like parts throughout. The accompanying drawings are intended to illustrate the invention, but are not necessarily to scale.

BRIEF DESCRIPTION OF THE DRAWINGS

FIG. 8 is a schematic drawing illustrating the melt cooler mounted horizontally with respect to the diverter valve in accordance with another embodiment of the present invention in which the melt cooler inlet line enters a bottom portion of the cooler.

FIG. 9 is a schematic drawing illustrating the melt cooler mounted horizontally with respect to the diverter valve in accordance with another embodiment of the present invention in which the melt cooler inlet line and the melt cooler outlet line are oriented in a side-by-side configuration.

FIGS. 17A, 17B, and 17C are schematic drawings illustrating a melt cooler and diverter valve in accordance with another embodiment of the present invention.

DETAILED DESCRIPTION OF THE PREFERRED EMBODIMENTS

Figure 1:
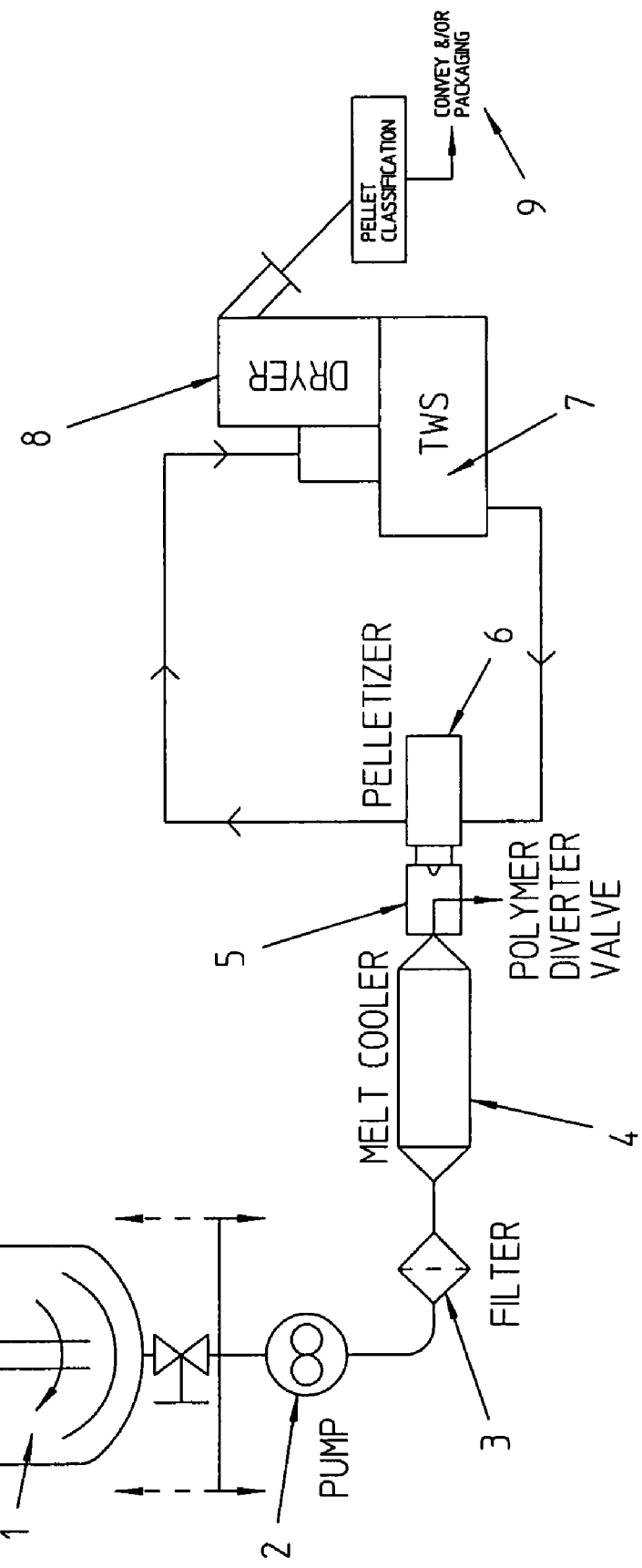
FIG. 1 is a schematic drawing illustrating a known prior art production process utilizing a conventional melt cooler and polymer diverter valve.
Figure 2:
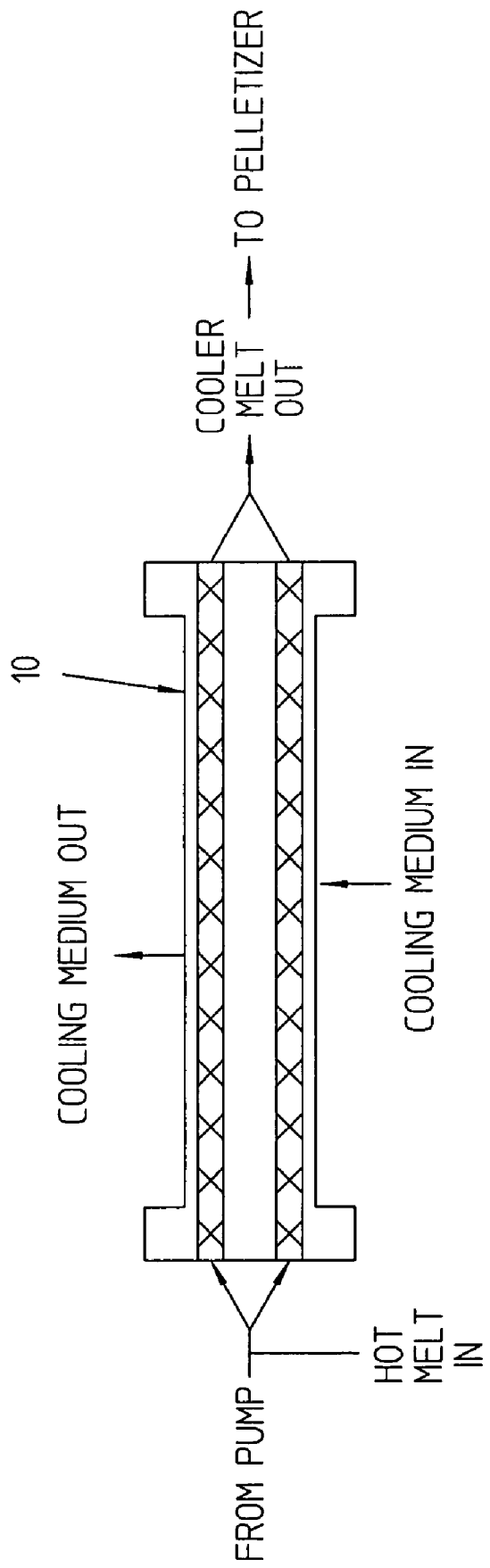
FIG. 2 is a schematic drawing illustrating a conventional melt cooler of a single pass shell and tube design as used in the prior art apparatus and process of FIG. 1.
Figure 3:
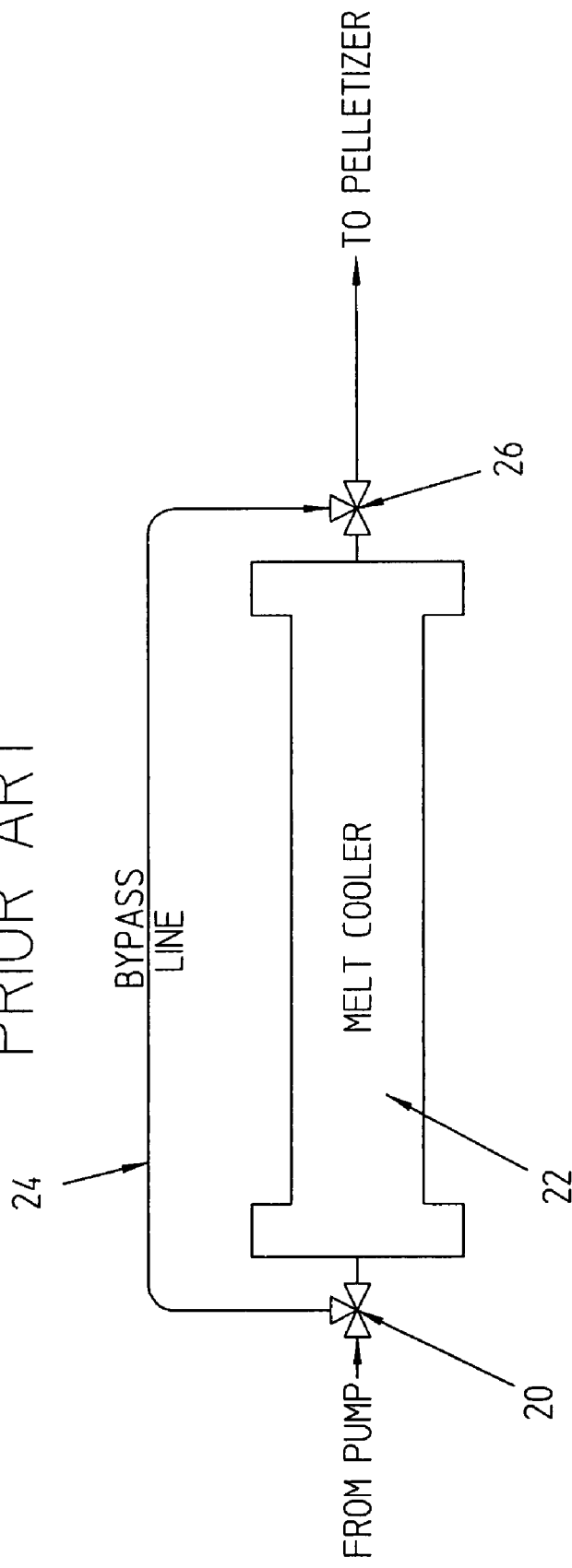
FIG. 3 is a schematic drawing illustrating a conventional melt cooler and bypass line used in the known prior art apparatus and process of FIG. 1.

Although preferred embodiments of the invention are explained in detail, it is to be understood that other embodiments are possible. Accordingly, it is not intended that the invention is to be limited in its scope to the details of constructions, and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose. Where possible, components of the drawings that are alike are identified by the same reference numbers.

Figure 4:
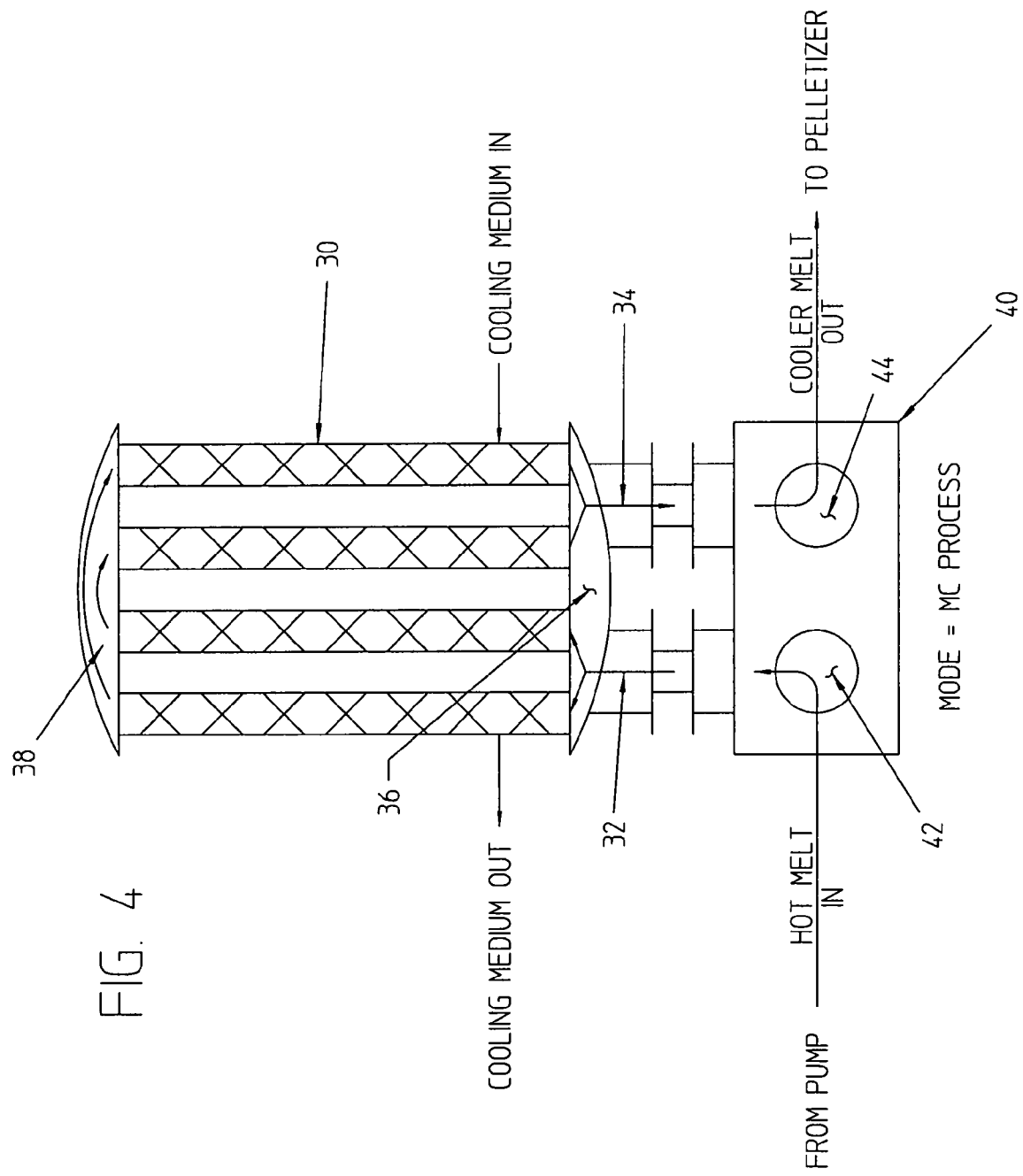
FIG. 4 is a schematic drawing illustrating a vertically mounted double pass type melt cooler mounted above a diverter valve in accordance with one embodiment of the present invention.

Referring now specifically to FIG. 4 of the drawings, there is illustrated a double pass type heat exchanger as the melt cooler, generally designated by reference numeral 30, for a pelletizing production line such as is shown in FIG. 1. The melt cooler 30 includes an inlet 32 and an outlet 34 adjacent to each other at the bottom 36 of the melt cooler. Hence, the polymer entering inlet 32 travels up the left-hand side of the cooler 30, transfers at the top 38 of the cooler to the right-hand side, where it passes downwardly and exits through outlet 34.

The diverter valve in accordance with the present invention is generally designated by reference numeral 40 in FIG. 4. As shown therein, the hot melt entering the diverter valve 40 is directed toward melt cooler inlet 32 by valve component 42 from the pump, such as pump 2 and filter 3 for the process line shown in FIG. 1. Similarly, cooled polymer exiting the melt cooler through outlet 34 communicates with valve component 44 of diverter valve 40, where it is directed out toward the pelletizer, such as the die and pelletizer 6 shown in FIG. 1.

Figure 5:
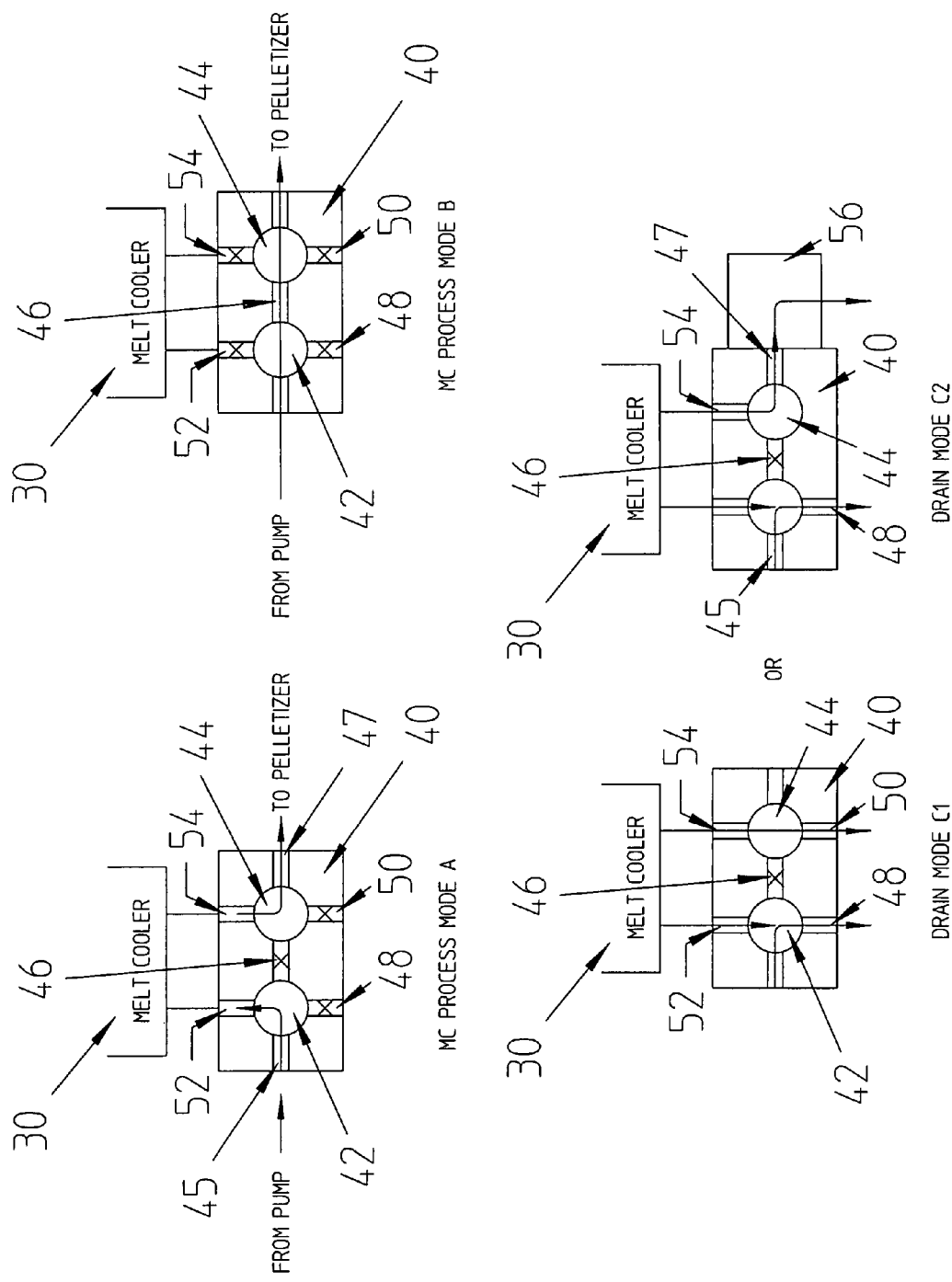
FIG. 5 is a schematic drawing illustrating the operational modes for the diverter valve in combination with the melt cooler as shown in FIG. 4 in accordance with the present invention.
Figure 14:
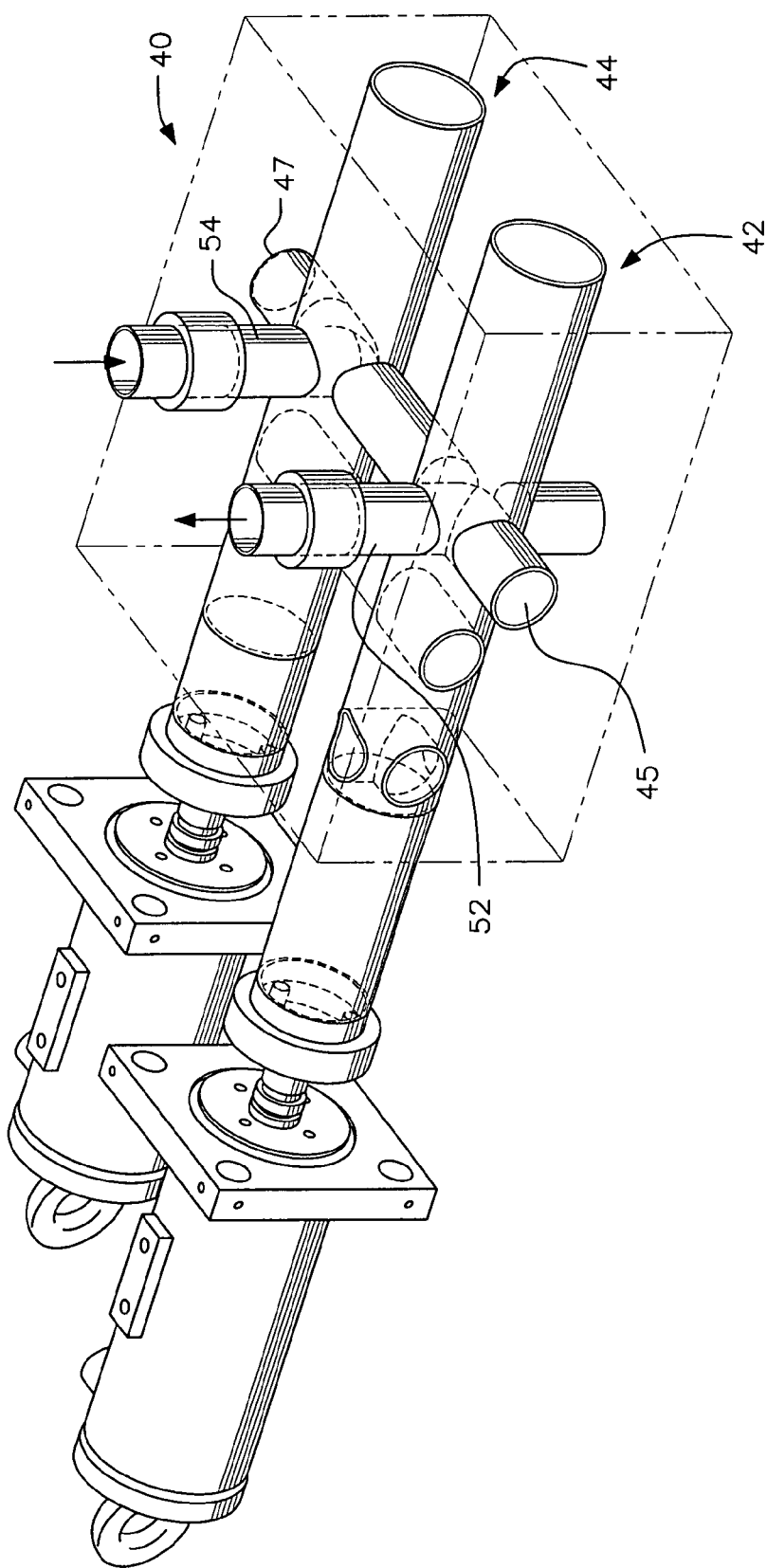
FIG. 14 is a perspective view drawing illustrating the diverter valve in accordance with the present invention in a cooling mode of operation.

Turning now to FIG. 5, four modes of operation of the diverter valve 40 in conjunction with the melt cooler 30, as shown in FIG. 4, are illustrated. An "x" in a valve line of the diverter valve 40 indicates that the valve line is closed. Starting from the left-hand side, the first illustration in FIG. 5, identified as "MC PROCESS MODE A," shows the diverter valve 40 operating as described in connection with FIG. 4. More specifically, diverter valve bypass line 46 between valve components 42 and 44 is closed, as well as valve drain (i.e., melt drain) lines 48 and 50. As such, polymer or extrudate entering valve 40 through valve entry (i.e., hot melt inlet) line 45 is directed by valve component 42 to melt cooler 30. Cooled material exiting cooler 30 is directed by valve component 44 out of diverter valve 40 through valve outlet (i.e., cooled melt) line 47 toward the pelletizer. FIG. 14 provides a detailed view of the diverter valve 40 positioned in the cooling mode of operation.

Figure 15:
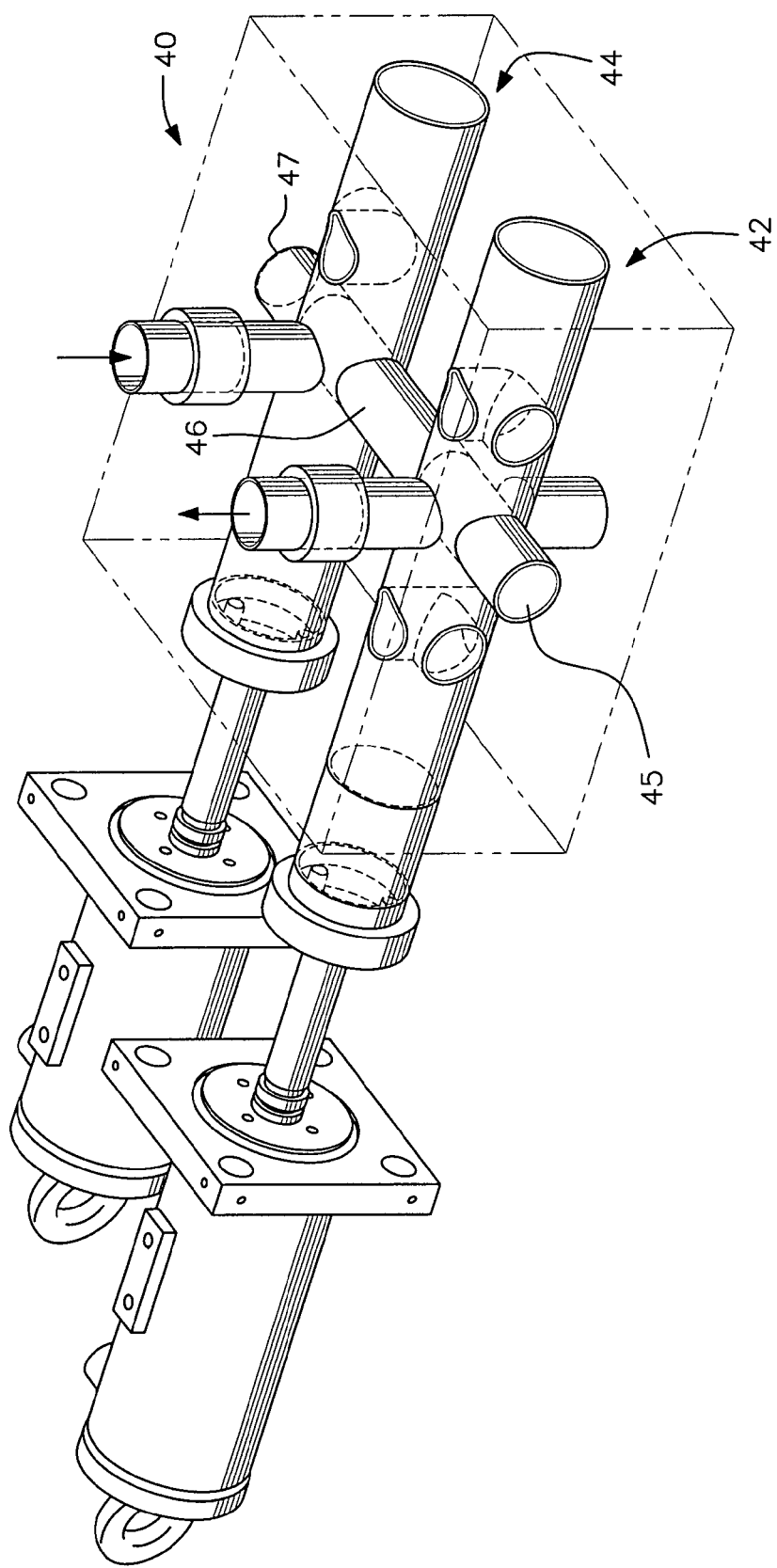
FIG. 15 is perspective view drawing illustrating the diverter valve shown in FIG. 14 in a bypass mode of operation.

In the second mode, entitled "MC PROCESS MODE B," the diverter valve 40 is in the bypass mode. As such, diverter valve bypass line 46 is open, valve drain lines 48 and 50 remain closed, and valve cooler entry (i.e., hot melt outlet) line 52, connecting to inlet 32 of the melt cooler 30, and valve cooler exit (i.e., cooled melt inlet) line 54, connecting to outlet 34 of the melt cooler 30, are also both closed. As such, polymer or other extrudate flows directly from valve entry line 45 to valve outlet line 47 through the diverter valve 40, thus bypassing the melt cooler 30. FIG. 15 provides a detailed view of the diverter valve 40 positioned in the bypass mode of operation.

Referring now to the third mode illustrated in FIG. 5, entitled "DRAIN MODE C1," there is illustrated a first drain mode. In this drain mode, the diverter valve bypass line 46 is closed, valve drain lines 48 and 50 are open, along with valve cooler entry line 52 and valve cooler exit line 54, so that polymer in the melt cooler can drain away. Similarly, valve entry line 45 and valve outlet line 47 are open so that polymer or other extrudate upstream or downstream, respectively, from the diverter valve can also drain out through valve drains 48 and 50, respectively.

Figure 16:
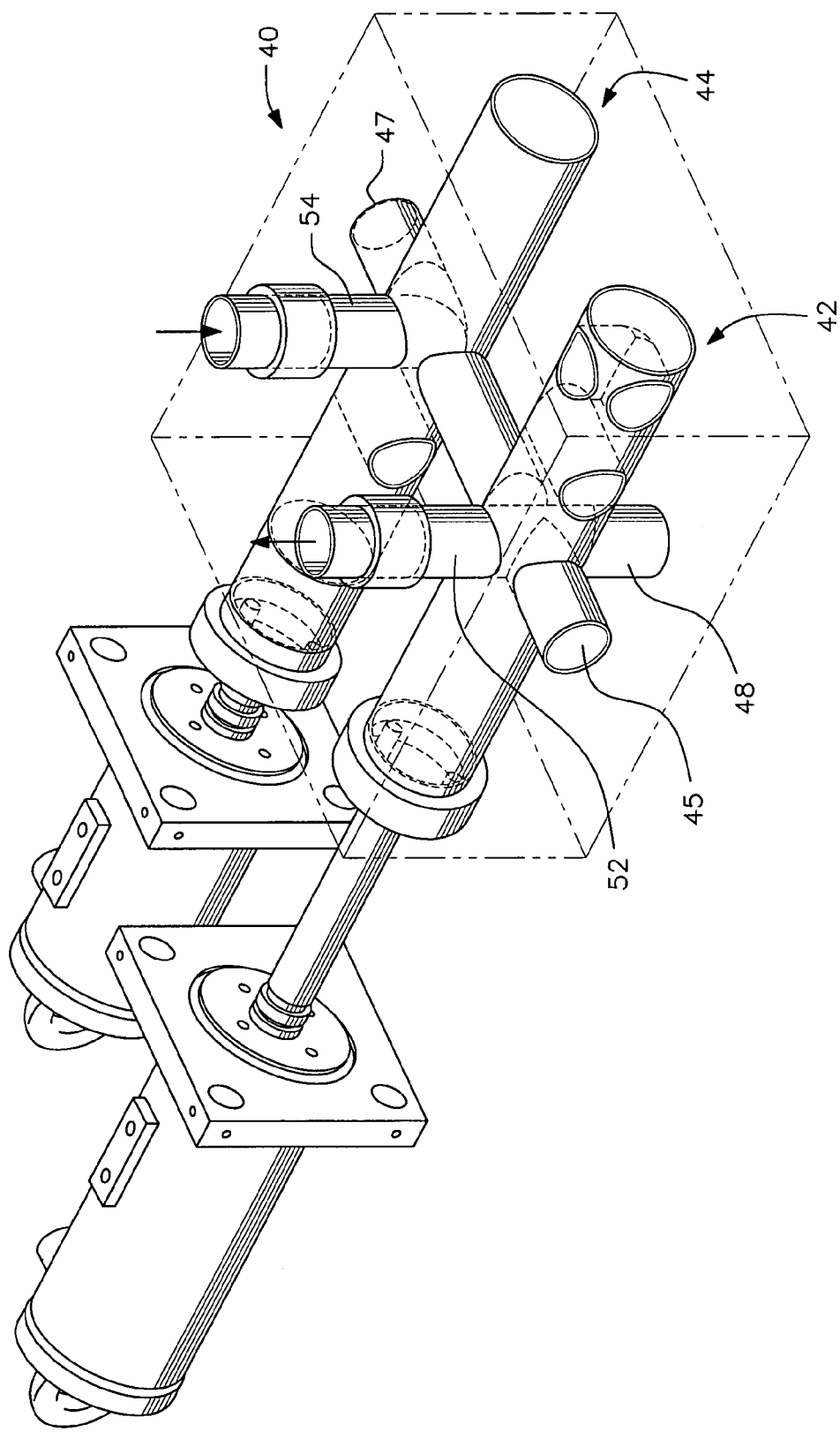
FIG. 16 is perspective view drawing illustrating the diverter valve shown in FIG. 14 in a drain mode of operation.

In an alternate drain mode shown in the fourth (i.e., most right-hand) illustration in FIG. 5, entitled "DRAIN MODE C2," the diverter valve bypass line 46 is closed. Polymer from the left-hand side (i.e., upstream side) of melt cooler 30 drains out through diverter valve 40 in the same manner as described above in conjunction with DRAIN MODE C1, along with polymer upstream of the diverter valve 40 through valve entry line 45. Polymer on the right-hand side (i.e., downstream side) of melt cooler 30 exits through valve cooler exit line 54 past valve component 44, out valve outlet line 47, and then drains out through a separate external polymer diverter valve 56 (which may also serve as a "startup" valve), such as polymer diverter valve 5 shown in FIG. 1. FIG. 16 provides a detailed view of the diverter valve positioned in the Drain Mode C2 mode of operation.

Figure 6:
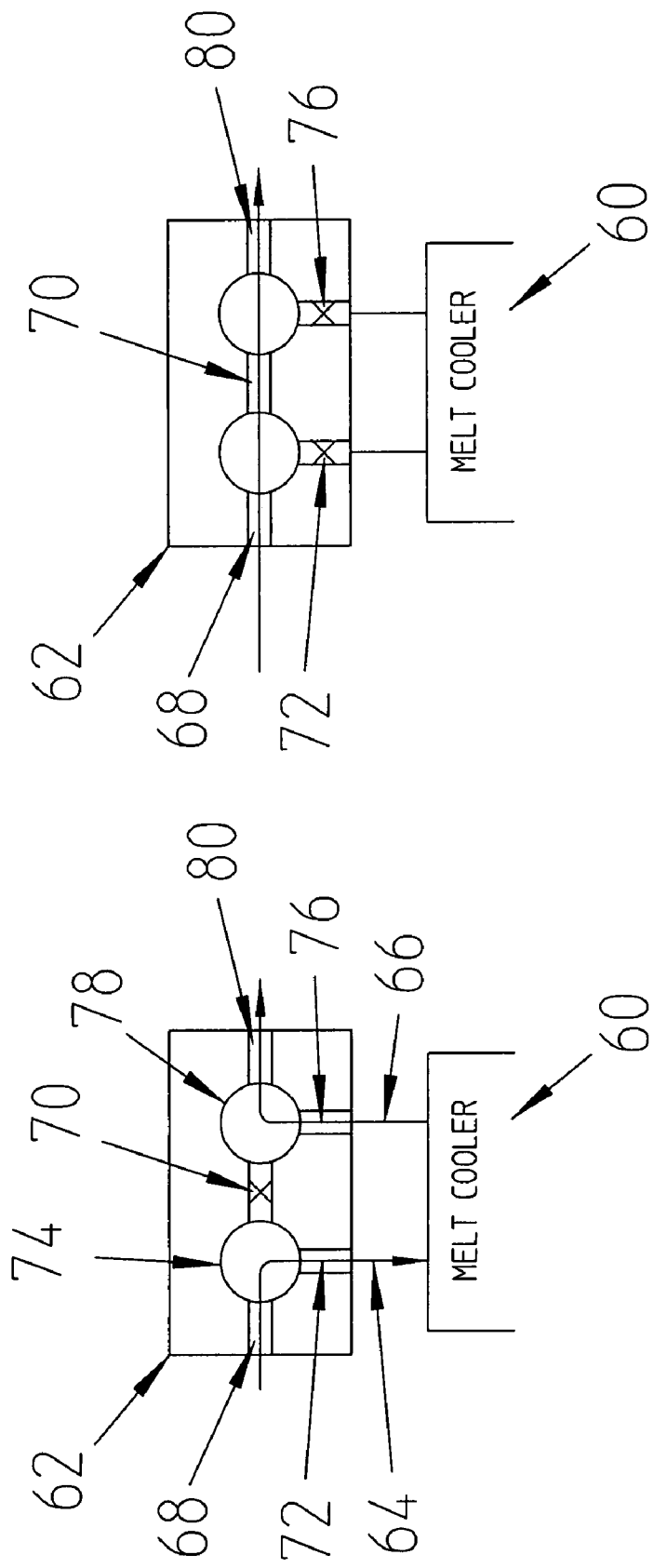
FIG. 6 is a schematic drawing illustrating a vertical positioning of the melt cooler beneath the diverter valve in accordance with another embodiment of the present invention.

FIG. 6 illustrates an alternate arrangement of the melt cooler and diverter valve in accordance with the present invention. In this embodiment, a melt cooler 60 is vertically positioned below the diverter valve, generally designated by reference numeral 62, and the inlet 64 to the melt cooler and the exit 66 from the melt cooler are both mounted at the top of the melt cooler, as shown. In the left-hand view of FIG. 6, hot melt polymer enters the valve 62 through valve inlet line 68. With diverter valve bypass line 70 closed and valve cooler inlet line 72 open, valve component 74 directs the hot melt into the cooler 60. During steady state process conditions, cooled polymer exiting the melt cooler at 66 enters the diverter valve 62 through valve cooler exit line 76, and by valve component 78 is directed out through valve outlet line 80.

In the bypass mode, as shown in the right-hand illustration of FIG. 6, the valve cooler inlet line 72 and valve cooler exit line 76 are both closed, while the diverter valve bypass line 70 is open. Thus, hot melt polymer entering valve 62 through valve inlet line 68 bypasses the cooler 60 by flowing through diverter valve bypass line 70 directly to valve exit line 80.

Figure 7:
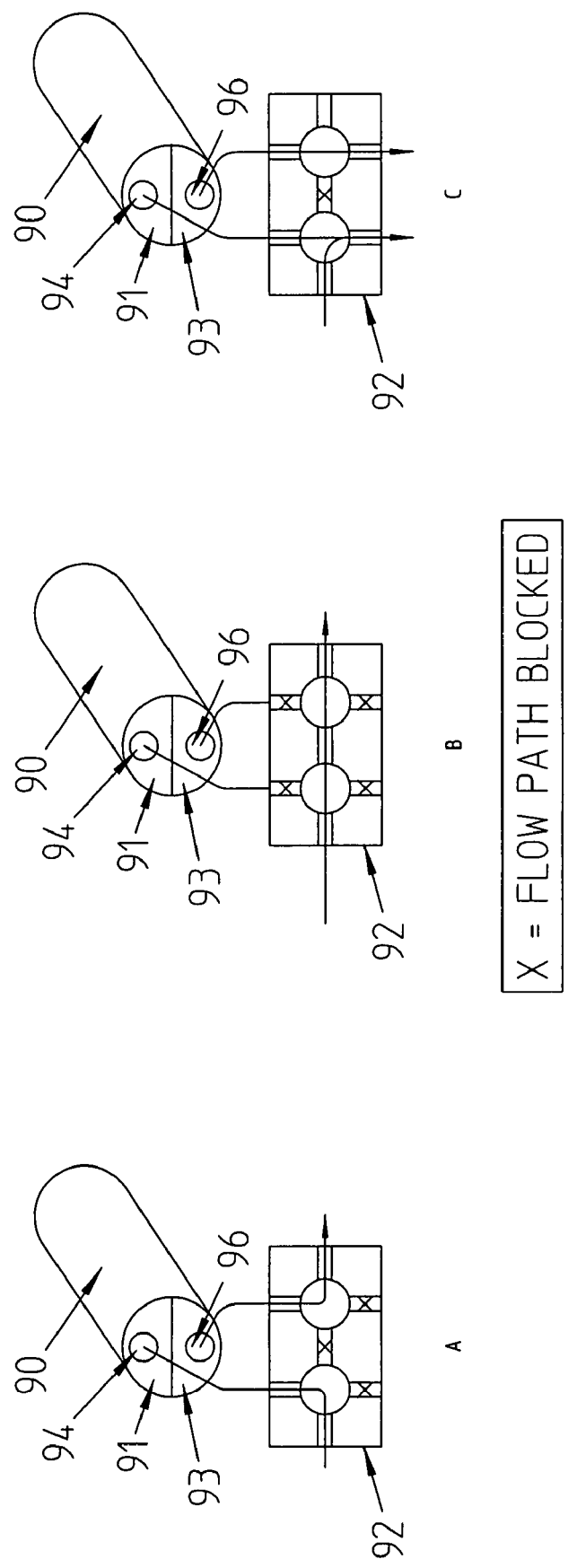
FIG. 7 is a schematic drawing illustrating the melt cooler mounted horizontally with respect to the diverter valve in accordance with another embodiment of the present invention in which the melt cooler inlet line enters a top portion of the cooler.

FIG. 7 illustrates a third possible orientation of the melt cooler with respect to the diverter valve in accordance with the present invention. More specifically, melt cooler 90 is shown positioned horizontally with respect to the diverter valve generally designated by reference numeral 92. As shown, both the inlet 94 and outlet 96 are positioned at the end of the melt cooler 90 adjacent the diverter valve 92. The inlet 94 is positioned in a top portion 91 of melt cooler 90 and the outlet 96 is positioned in a bottom portion 93 of melt cooler 90. The normal operating mode by which the hot melt polymer is directed by the diverter valve 92 through the melt cooler 90 is shown in the left-hand illustration of FIG. 7, marked "A." The bypass mode is shown in the center illustration of FIG. 7, marked "B," and the drain mode is shown in the right-hand illustration, marked "C." In each mode of operation, the diverter valve 92 operates in the same manner as described above for diverter valves 40 and 62 and, therefore, the description of the operation is not repeated here.

FIG. 8 illustrates another embodiment of the invention in which the orientation of the melt cooler with respect to the diverter valve is the same as is shown in FIG. 7. More specifically, melt cooler 90 is shown positioned horizontally with respect to the diverter valve generally designated by reference numeral 92. As shown, both the inlet 94 and outlet 96 are positioned at the end of the melt cooler 90 adjacent the diverter valve 92. In this embodiment, the inlet 94 is positioned in the bottom portion 93 of melt cooler 90 and the outlet 96 is positioned in the top portion 91 of melt cooler 90. The normal operating mode by which the hot melt polymer is directed by the diverter valve 92 through the melt cooler 90 is shown in the left-hand illustration of FIG. 8, marked "A." The bypass mode is shown in the center illustration of FIG. 8, marked "B," and the drain mode is shown in the right-hand illustration, marked "C." In each mode of operation, the diverter valve 92 operates in the same manner as described above for diverter valves 40 and 62 and, therefore, the description of the operation is not repeated here.

FIG. 9 illustrates another embodiment of the invention in which the orientation of the melt cooler with respect to the diverter valve is the same as is shown in FIG. 7. More specifically, melt cooler 90 is shown positioned horizontally with respect to the diverter valve generally designated by reference numeral 92. As shown, both the inlet 94 and outlet 96 are positioned at the end of the melt cooler 90 adjacent the diverter valve 92. In this embodiment, the inlet 94 and the outlet 96 are located in opposing portions 97 and 98 of the melt cooler in a side-by-side configuration. The normal operating mode by which the hot melt polymer is directed by the diverter valve 92 through the melt cooler 90 is shown in the left-hand illustration of FIG. 9, marked "A." The bypass mode is shown in the center illustration of FIG. 9, marked "B," and the drain mode is shown in the right-hand illustration, marked "C." In each mode of operation, the diverter valve 92 operates in the same manner as described above for diverter valves 40 and 62 and, therefore, the description of the operation is not repeated here.

Figure 10:
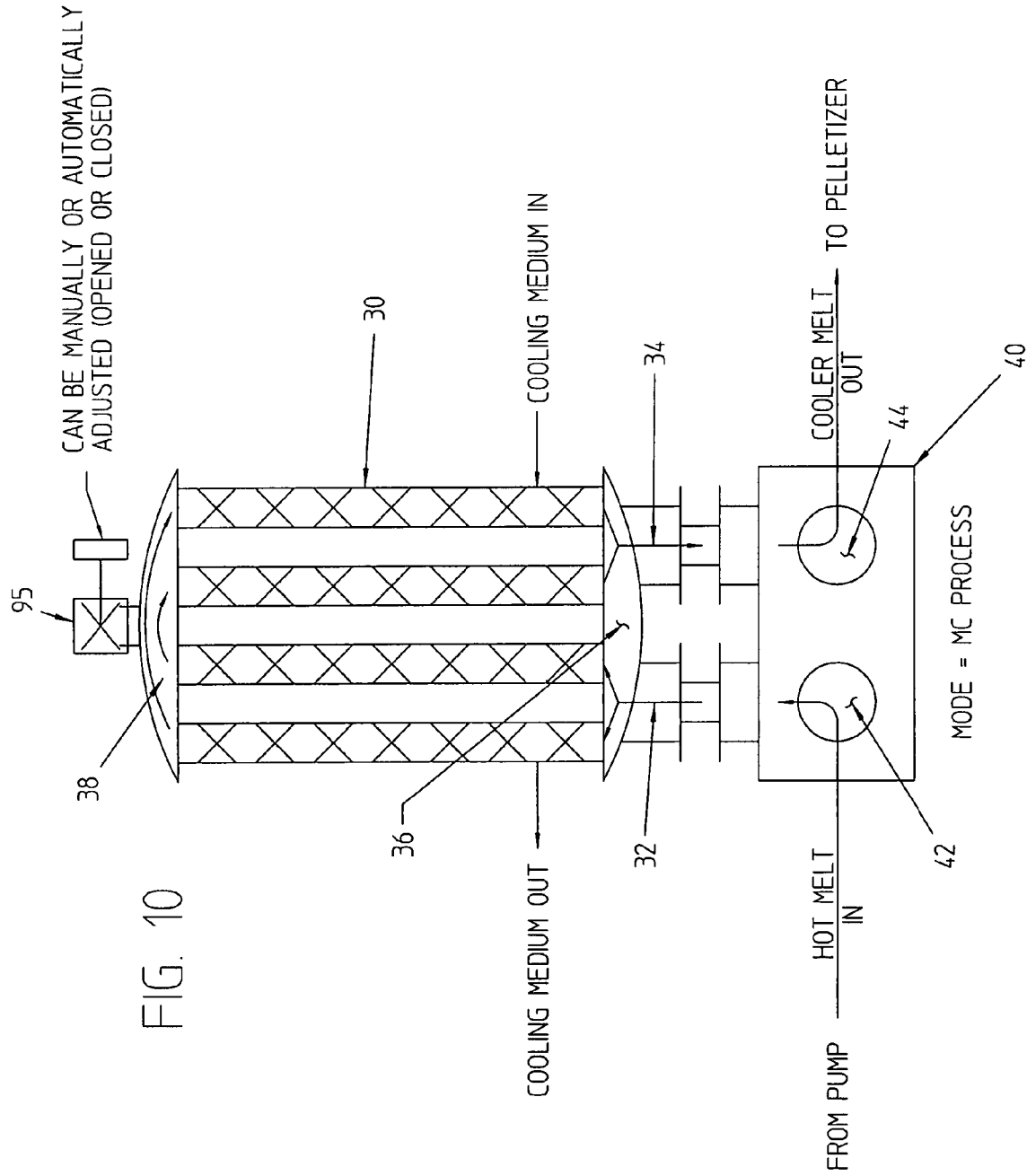
FIG. 10 is a schematic drawing illustrating the melt cooler shown in FIG. 4 with a top-mounted vent.
Figure 11:
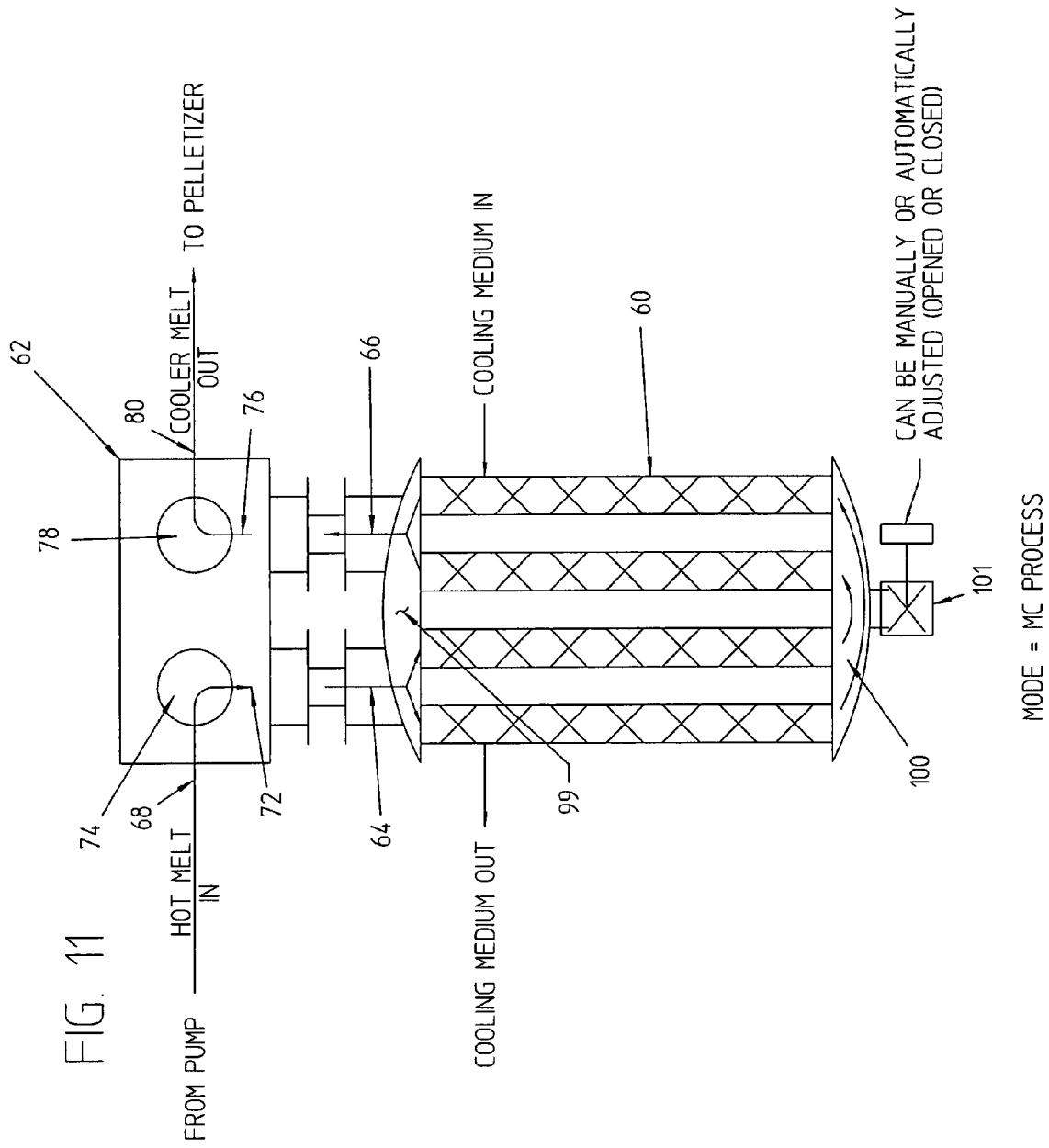
FIG. 11 is a schematic drawing illustrating the melt cooler shown in FIG. 6 with a bottom-mounted vent and drain.

As shown in FIGS. 10 and 11, respectively, melt cooler 30 and melt cooler 60 can be configured to vent compressible fluids and to drain the polymeric melt and other fluids. FIG. 10 illustrates a vent 95 located on the top 38 of melt cooler 30. FIG. 11 illustrates a vent and drain 101 located on the bottom 100 of melt cooler 60.

Figure 12:
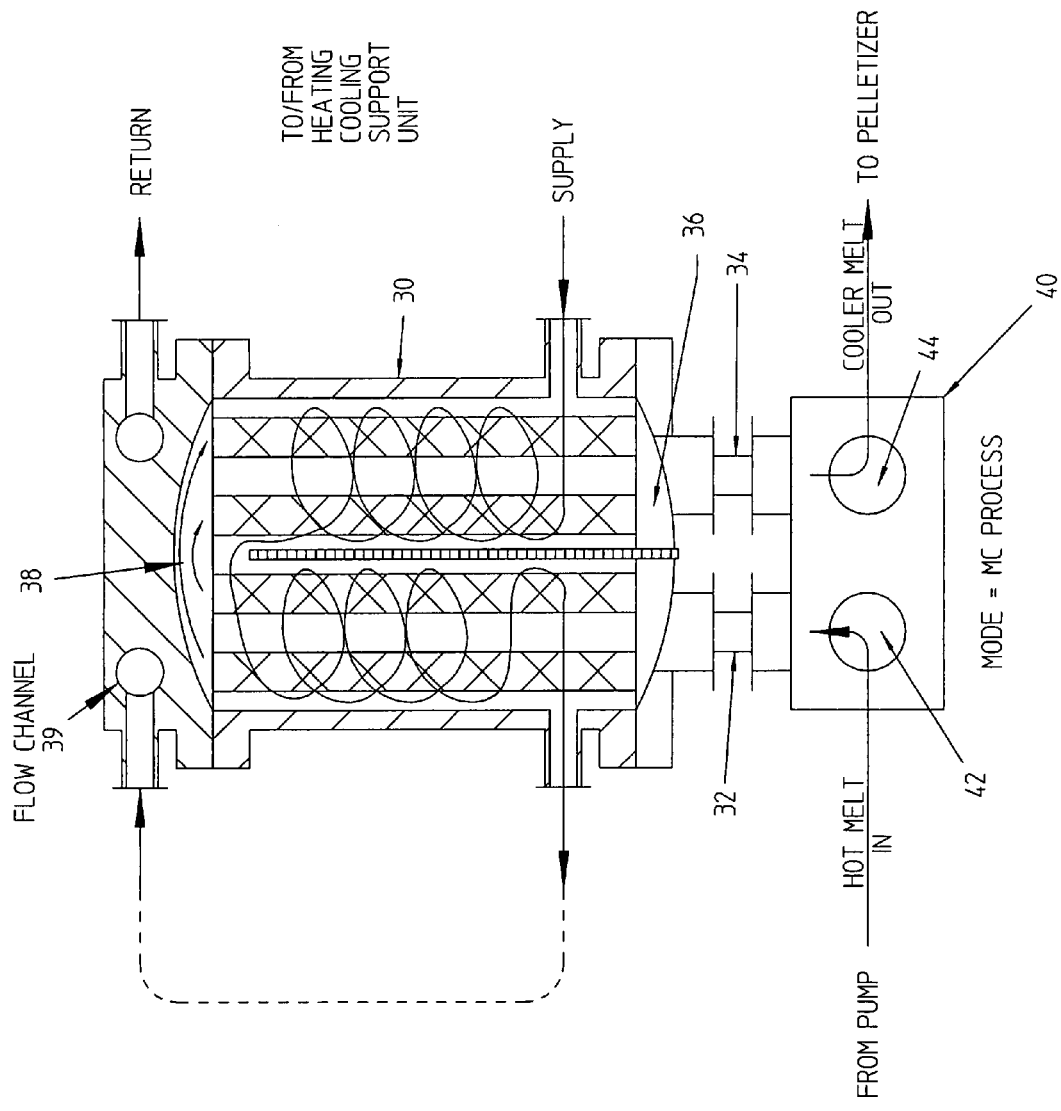
FIG. 12 is schematic drawing illustrating the melt cooler shown in FIG. 4 with a top head heated/cooled by a thermal transfer fluid.
Figure 13:
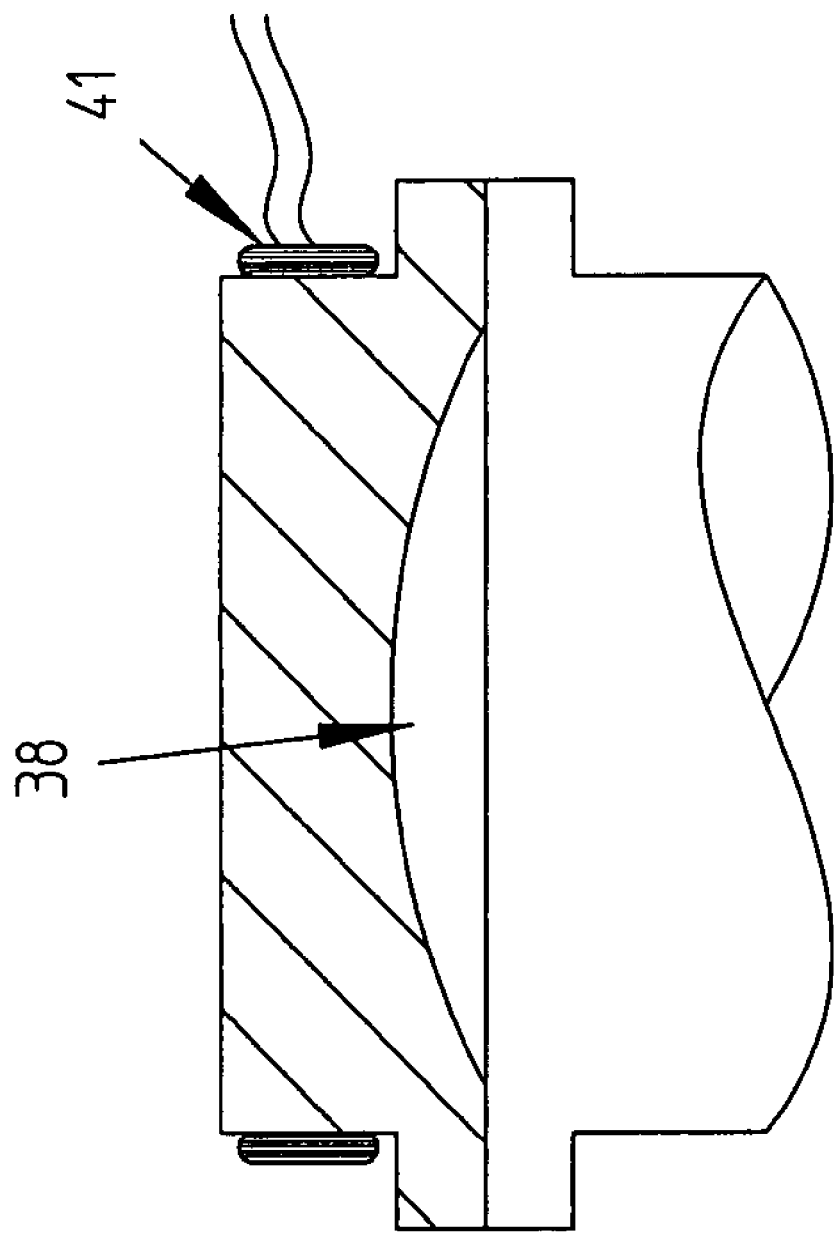
FIG. 13 is schematic drawing illustrating a portion of the melt cooler shown in FIG. 4 with a top head temperature controlled electrically.

To provide for the desired melt flow regimes in the top 38 of melt cooler 30, the top 38 can be heated. For example, as illustrated in FIG. 12, the top 38 can be heated or cooled by a thermal transfer fluid that passes through flow channel 39. In another possible heating configuration as illustrated in FIG. 13, the top 38 can be heated electrically, such as for example, by an electric heater 41. Controlling the temperature of the top 38 ensures that the melt does not cool below a predetermined temperature as it turns through top 38 from a first process side of the melt cooler to a second process side of the melt cooler.

As indicated above, FIGS. 14, 15, and 16 provide detailed views of the diverter valve 40 in, respectively, the cooling mode, the bypass mode, and the drain mode of operation. The diverter valve 40 has a body housing capable of being heated by jacket using steam or other thermal transfer fluid or by electric heater cartridges. In a preferred embodiment, the first movable valve component 42 is a hydraulically actuatable bolt having three sets of flow channels therein, and the second movable valve component 44 is a hydraulically actuatable bolt having two sets of flow channels therein. In other possible embodiments of the diverter valve 40, the bolts can include two or three sets of flow channels, either as a straight-through flow channel or as a 90° turn flow channel or as a tee-flow channel, specifically placed along the bolt length. Each of these flow channels is moved into the required position by a fluid controlled cylinder, and aligns with the corresponding required inlets and/or outlets of the diverter valve, based on the desired position required by the operator running the process, as will be understood by those skilled in the valve art. The positioning of the fluid powered cylinders, and thus the bolt position, can be controlled by manually operating a fluid flow valve or by automatic control such by a PLC, or by both.

Figure 17A:
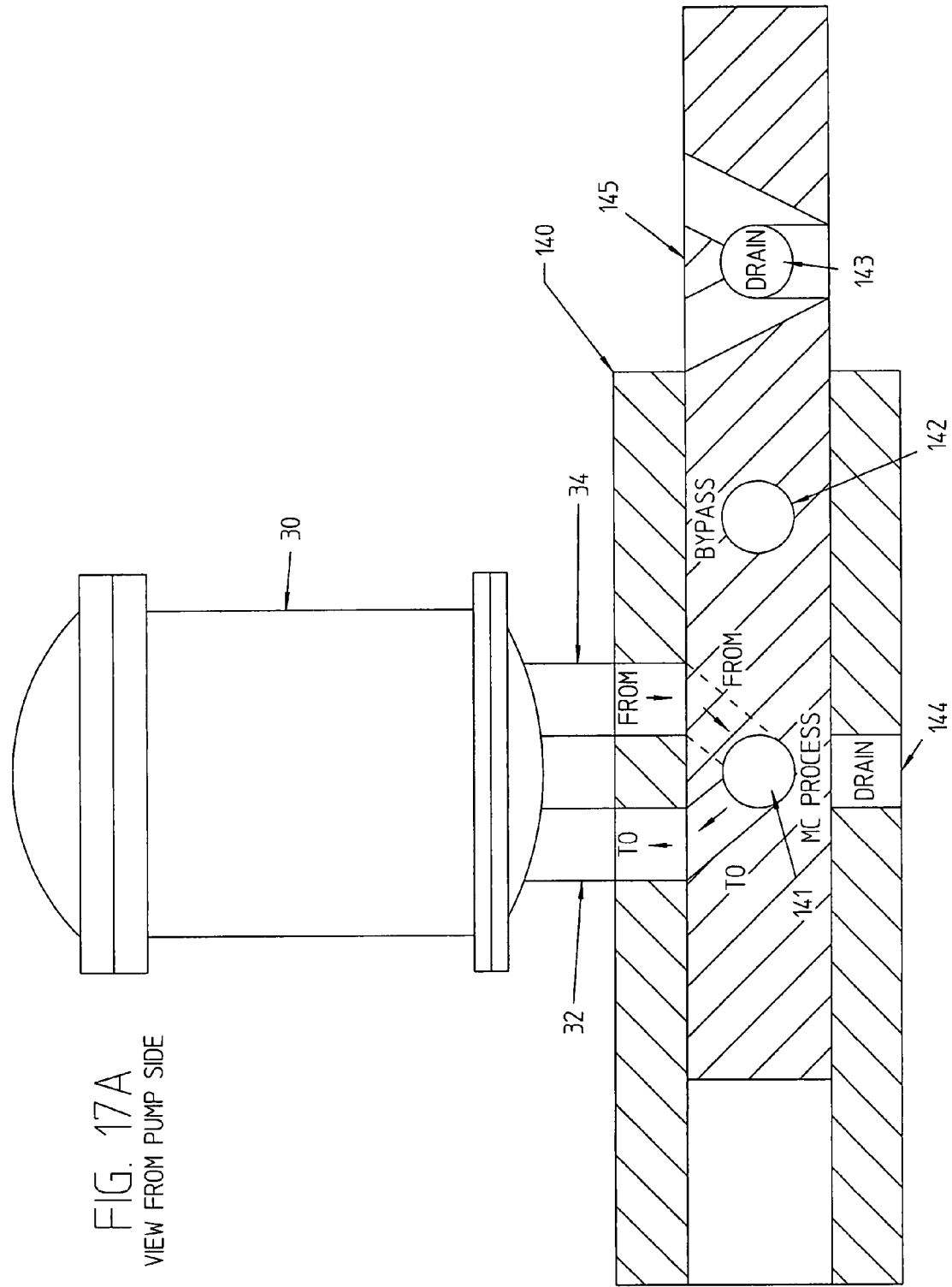
Figure 17C:
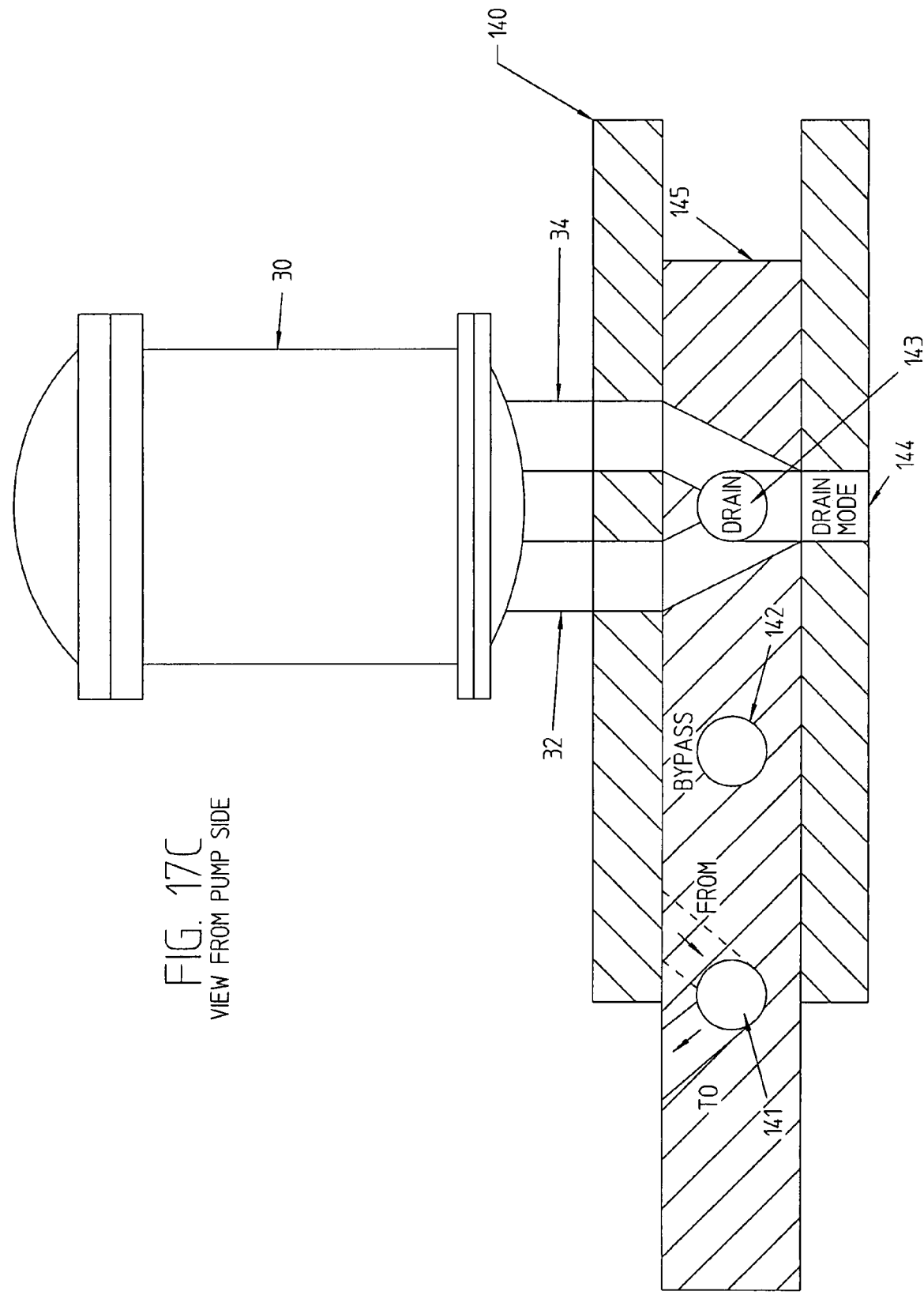

According to another embodiment of the invention, the melt cooler 30 is oriented perpendicular to the melt flow path through a diverter valve 140. As illustrated in FIGS. 17A, 17B, and 17C, the diverter valve 140 has a single movable valve component 145. Movable valve component 145 is a hydraulically actuatable bolt having three sets of flow channels therein, including a cooling flow channel 141, a bypass flow channel 142, and a drain flow channel 143. The single bolt embodiment of the diverter valve provides a relatively short melt flow path and an economical valve construction.

Another embodiment of the invention is directed to a method of cooling a polymeric melt for an underwater pelletizer. See, e.g., FIG. 5 for an illustration of the various configurations of the diverter valve that are associated with the method. The method is employed with a diverter valve 40 that has two melt drain lines. The method includes conveying the melt to a diverter valve 40 that conveys the melt to and from a melt cooler 30 during a cooling mode of operation, conveys the melt around the cooler 30 during a bypass mode of operation, and drains the melt from the cooler 30 and from the diverter valve 40 during a drain mode of operation. The diverter valve 40 has a hot melt inlet line 45, a first movable valve component 42, a hot melt outlet line 52 to the melt cooler 30, a hot melt bypass line 46, a cooled melt inlet line 54 from the melt cooler 30, a second movable valve component 44, a cooled melt outlet line 47, and first 48 and second 50 melt drain lines.

The diverter valve 40 is configured for the cooling mode (see FIG. 5, MC PROCESS MODE A) by positioning the first movable valve component 42 so as to close the hot melt bypass line 46 and close the first melt drain line 48, and positioning the second movable valve component 44 so as to open the cooled melt inlet line 54 from the melt cooler 30 and close the second melt drain line 50, thereby conveying the melt through the melt cooler 30 and out of the diverter valve 40 through the cooled melt outlet line 47.

The diverter valve 40 is configured for the bypass mode (see FIG. 5, MC PROCESS MODE B) by positioning the first movable valve component 42 so as to close the hot melt outlet line 52 to the melt cooler 30 and close the first melt drain line 48, and positioning the second movable valve component 44 so as to close the cooled melt inlet line 54 from the melt cooler 30 and close the second melt drain line 50, thereby conveying the melt around the melt cooler 30 and out of the diverter valve 40 through the cooled melt outlet line 47.

The diverter valve 40 is configured for the drain mode (see FIG. 5, MC DRAIN MODE C1) by positioning the first movable valve component 42 so as to open the hot melt outlet line 52 to the melt cooler 30, close the hot melt bypass line 46, and open the first melt drain line 48, and positioning the second movable valve component 44 so as to open the cooled melt inlet line 54 from the melt cooler 30 and open the second melt drain line 50. This conveys the melt from the hot melt inlet line 45 and from a first process side of the melt cooler 30 out of the diverter valve 40 through the first melt drain line 48, and conveys the melt from a second process side of the melt cooler 30 and from the cooled melt outlet line 47 out of the diverter valve 40 through the second melt drain line 50.

Still another embodiment of the invention is directed to a method of cooling a polymeric melt for an underwater pelletizer in which the diverter valve 40 has a single melt drain line 48 (see FIG. 5, MC DRAIN MODE C2). The method includes conveying the melt to a diverter valve 40 that conveys the melt to and from a melt cooler 30 during a cooling mode of operation, conveys the melt around the cooler 30 during a bypass mode of operation, and drains the melt from the cooler 30 and from the diverter valve 40 during a drain mode of operation. The diverter valve 40 has a hot melt inlet line 45, a first movable valve component 42, a hot melt outlet line 52 to the melt cooler 30, a hot melt bypass line 46, a cooled melt inlet line 54 from the melt cooler 30, a second movable valve component 44, a cooled melt outlet line 47, and a melt drain line 48.

The diverter valve 40 is configured for the cooling mode by positioning the first movable valve component 42 so as to close the hot melt bypass line 46 and close the melt drain line 48, and positioning the second movable valve component 44 so as to open the cooled melt inlet line 54 from the melt cooler 30, thereby conveying the melt through the melt cooler 30 and out of the diverter valve 40 through the cooled melt outlet line 47.

The diverter valve 40 is configured for the bypass mode by positioning the first movable valve component 42 so as to close the hot melt outlet line 52 to the melt cooler 30 and the melt drain line 48, and positioning the second movable valve component 44 so as to close the cooled melt inlet line 54 from the melt cooler 30, thereby conveying the melt around the melt cooler 30 and out of the diverter valve 40 through the cooled melt outlet line 47.

The diverter valve 40 is configured for the drain mode (see FIG. 5, MC DRAIN MODE C2) by positioning the first movable valve component 42 so as to open the hot melt outlet line 52 to the melt cooler 30 and close the hot melt bypass line 46, and positioning the second movable valve component 44 so as to open the cooled melt inlet line 54 from the melt cooler 30. This conveys the melt from the hot melt inlet line 45 and from a first process side of the melt cooler 30 out of the diverter valve 40 through the melt drain line 48, and conveys the melt from a second process side of the melt cooler 30 out of the diverter valve 40 through the cooled melt outlet line 47.

It is not intended that the present invention be limited to the specific apparatus and methods described herein. The foregoing is considered as illustrative only of the principles of the invention. For example, the concepts disclosed herein are applicable to a system and method for controlled pelletization processing as described in PCT/US2006/045375, an application owned by the assignee of the present invention, the disclosure of which is expressly incorporated by reference in this application as if fully set forth herein.

Additionally, while the various embodiments of the invention have been described primarily in the context of cooling a polymer melt, in another possible embodiment the system described herein can be employed to heat a fluid. Furthermore, while the system has been described in the context of an underwater pelletizing process, the system is equally applicable to other processes in which various heat exchange configurations of a process fluid are required.

Further, numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A melt cooler and valving system for an underwater pelletizer, comprising:
   a melt cooler that cools a polymeric melt, including a melt cooler inlet line that conveys the melt to the cooler, and a melt cooler outlet line that conveys the cooled melt from the cooler; and
   a diverter valve configured to convey the melt to and from the cooler during a cooling mode of operation, to convey the melt around the cooler during a bypass mode of operation, and to drain the melt from the cooler and from the diverter valve during a drain mode of operation,
   the diverter valve including a first and a second positionable valve component each (i) having a plurality of sets of flow channels therein and (ii) being independently positionable so as to effect separately and independently the cooling mode of operation, the bypass mode of operation, and the drain mode of operation.

2. The melt cooler and valving system according to claim 1, wherein the diverter valve includes a hot melt inlet line, a hot melt outlet line to the melt cooler, a hot melt bypass line, a cooled melt inlet line from the melt cooler, a cooled melt outlet line, and a melt drain line.

3. The melt cooler and valving system according to claim 2, wherein to configure the diverter valve for the cooling mode the first positionable valve component is positioned so as to open the hot melt outlet line to the melt cooler, close the hot melt bypass line, and close the melt drain line, and the second positionable valve component is positioned so as to open the cooled melt inlet line from the melt cooler, thereby providing a melt flow path through the melt cooler and out of the diverter valve through the cooled melt outlet line.

4. The melt cooler and valving system according to claim 2, wherein to configure the diverter valve for the bypass mode the first positionable valve component is positioned so as to close the hot melt outlet line to the melt cooler and close the melt drain line, and the second positionable valve component is positioned so as to close the cooled melt inlet line from the melt cooler, thereby providing a melt flow path around the melt cooler and out of the diverter valve through the cooled melt outlet line.

5. The melt cooler and valving system according to claim 2, wherein to configure the diverter valve for the drain mode the first positionable valve component is positioned so as to open the hot melt outlet line to the melt cooler, close the hot melt bypass line, and open the melt drain line, and the second positionable valve component is positioned so as to open the cooled melt inlet line from the melt cooler, thereby providing a melt flow path from the hot melt inlet line and from a first process side of the melt cooler out of the diverter valve through the melt drain line, and providing a melt flow path from a second process side of the melt cooler out of the diverter valve through the cooled melt outlet line.

6. The melt cooler and valving system according to claim 1, wherein the melt cooler is located in a vertical orientation above the diverter valve.

7. The melt cooler and valving system according to claim 1, wherein the melt cooler is a double pass, shell and tube heat exchanger.

8. The melt cooler and valving system according to claim 7, wherein a process side of the heat exchanger includes static fluid mixing elements therein.

9. The melt cooler and valving system according to claim 7, wherein the heat exchanger has a jacketed top head that is heated by a thermal heat transfer fluid or by an electric heater cartridge.

10. The melt cooler and valving system according to claim 2, wherein a top portion of the melt cooler has a heated vent configured to release a compressible fluid therefrom and/or to facilitate drainage of the melt from a bottom portion of the cooler.

11. The melt cooler and valving system according to claim 1, wherein the melt cooler is located beneath the diverter valve in a vertical orientation and includes a melt drain line and a vent configured to release a compressible fluid in a bottom portion thereof, and the diverter valve includes a hot melt inlet line, a hot melt outlet line to the melt cooler, a hot melt bypass line, a cooled melt inlet line from the melt cooler, and a cooled melt outlet line.

12. The melt cooler and valving system according to claim 11, wherein to configure the diverter valve for the cooling mode the first positionable valve component is positioned so as to open the hot melt outlet line to the melt cooler and close the hot melt bypass line, and the second positionable valve component is positioned so as to open the cooled melt inlet line from the melt cooler, thereby providing a melt flow path through the melt cooler and out of the diverter valve through the cooled melt outlet line.

13. The melt cooler and valving system according to claim 11, wherein to configure the diverter valve for the bypass mode the first positionable valve component is positioned so as to close the hot melt outlet line to the melt cooler and open the hot melt bypass line, and the second positionable valve component is positioned so as to close the cooled melt inlet line from the melt cooler, thereby providing a melt flow path around the melt cooler and out of the diverter valve through the cooled melt outlet line.

14. The melt cooler and valving system according to claim 1, wherein the melt cooler is located in a horizontal orientation above the diverter valve.

15. The melt cooler and valving system according to claim 14, wherein the melt cooler inlet line is located in a top portion of the melt cooler, and the melt cooler outlet line is located in a bottom portion of the melt cooler.

16. The melt cooler and valving system according to claim 14, wherein the melt cooler inlet line and the melt cooler outlet line are located in opposing portions of the melt cooler in a side-by-side configuration.

17. The melt cooler and valving system according to claim 14, wherein the melt cooler inlet line is located in a bottom portion of the melt cooler, and the melt cooler outlet line is located in a top portion of the melt cooler.

18. The melt cooler and valving system according to claim 1, wherein the diverter valve includes a hot melt inlet line, a hot melt outlet line to the melt cooler, a hot melt bypass line, a cooled melt inlet line from the melt cooler, a cooled melt outlet line, and first and second melt drain lines.

19. The melt cooler and valving system according to claim 18, wherein to configure the diverter valve for the drain mode the first positionable valve component is positioned so as to open the hot melt outlet line to the melt cooler, close the hot melt bypass line, and open the first melt drain line, and the second positionable valve component is positioned so as to open the cooled melt inlet line from the melt cooler and open the second melt drain line, thereby providing a melt flow path from the hot melt inlet line and from a first process side of the melt cooler out of the diverter valve through the first melt drain line, and providing a melt flow path from a second process side of the melt cooler and from the cooled melt outlet line out of the diverter valve through the second melt drain line.

20. The melt cooler and valving system according to claim 2, wherein the melt cooler is oriented perpendicular to a melt flow path through the diverter valve, and the first positionable valve component is an actuatable bolt having three sets of flow channels therein.

21. A melt cooler valving system for an underwater pelletizer, comprising a diverter valve configured to convey polymeric melt to and from a melt cooler during a cooling mode of operation, to convey the melt around the cooler during a bypass mode of operation, and to drain the melt from the cooler and from the diverter valve during a drain mode of operation,
the diverter valve having a housing with a hot melt inlet line, a first positionable valve component, a hot melt outlet line to the melt cooler, a hot melt bypass line, a cooled melt inlet line from the melt cooler, a second positionable valve component, a cooled melt outlet line, and a melt drain line,
the first and second positionable valve components each (i) having a plurality of sets of flow channels therein and (ii) being independently positionable so as to effect separately and independently the cooling mode of operation, the bypass mode of operation, and the drain mode of operation.

22. The valving system according to claim 21, wherein the first positionable valve component is an actuatable bolt having three sets of flow channels therein, and the second positionable valve component is an actuatable bolt having two sets of flow channels therein.

23. A method of cooling a polymeric melt for an underwater pelletizer, comprising:
conveying the melt to a diverter valve that conveys the melt to and from a melt cooler during a cooling mode of operation, conveys the melt around the cooler during a bypass mode of operation, and drains the melt from the cooler and from the diverter valve during a drain mode of operation, the diverter valve having a hot melt inlet line, a first positionable valve component, a hot melt outlet line to the melt cooler, a hot melt bypass line, a cooled melt inlet line from the melt cooler, a second positionable valve component, a cooled melt outlet line, and first and second melt drain lines, the first and second positionable valve components each (i) having a plurality of sets of flow channels therein and (ii) being independently positionable so as to effect separately and independently the cooling mode of operation, the bypass mode of operation, and the drain mode of operation;
configuring the diverter valve for the cooling mode by positioning the first positionable valve component so as to close the hot melt bypass line and close the first melt drain line, and positioning the second positionable valve component so as to open the cooled melt inlet line from the melt cooler and close the second melt drain line, thereby conveying the melt through the melt cooler and out of the diverter valve through the cooled melt outlet line;
configuring the diverter valve for the bypass mode by positioning the first positionable valve component so as to close the hot melt outlet line to the melt cooler and close the first melt drain line, and positioning the second positionable valve component so as to close the cooled melt inlet line from the melt cooler and close the second melt drain line, thereby conveying the melt around the melt cooler and out of the diverter valve through the cooled melt outlet line; and
configuring the diverter valve for the drain mode by positioning the first positionable valve component so as to open the hot melt outlet line to the melt cooler, close the hot melt bypass line, and open the first melt drain line, and positioning the second positionable valve component so as to open the cooled melt inlet line from the melt cooler and open the second melt drain line, thereby conveying the melt from the hot melt inlet line and from a first process side of the melt cooler out of the diverter valve through the first melt drain line, and conveying the melt from a second process side of the melt cooler and from the cooled melt outlet line out of the diverter valve through the second melt drain line.

24. A method of cooling a polymeric melt for an underwater pelletizer, comprising:

conveying the melt to a diverter valve that conveys the melt to and from a melt cooler during a cooling mode of operation, conveys the melt around the cooler during a bypass mode of operation, and drains the melt from the cooler and from the diverter valve during a drain mode of operation, the diverter valve having a hot melt inlet line, a first positionable valve component, a hot melt outlet line to the melt cooler, a hot melt bypass line, a cooled melt inlet line from the melt cooler, a second positionable valve component, a cooled melt outlet line, and a melt drain line, the first and second positionable valve components each (i) having a plurality of sets of flow channels therein and (ii) being independently positionable so as to effect separately and independently the cooling mode of operation, the bypass mode of operation, and the drain mode of operation;

configuring the diverter valve for the cooling mode by positioning the first positionable valve component so as to close the hot melt bypass line and close the melt drain line, and positioning the second positionable valve component so as to open the cooled melt inlet line from the melt cooler, thereby conveying the melt through the melt cooler and out of the diverter valve through the cooled melt outlet line;

configuring the diverter valve for the bypass mode by positioning the first positionable valve component so as to close the hot melt outlet line to the melt cooler and the melt drain line, and positioning the second positionable valve component so as to close the cooled melt inlet line from the melt cooler, thereby conveying the melt around the melt cooler and out of the diverter valve through the cooled melt outlet line; and configuring the diverter valve for the drain mode by positioning the first positionable valve component so as to open the hot melt outlet line to the melt cooler and close the hot melt bypass line, and positioning the second positionable valve component so as to open the cooled melt inlet line from the melt cooler, thereby conveying the melt from the hot melt inlet line and from a first process side of the melt cooler out of the diverter valve through the melt drain line, and conveying the melt from a second process side of the melt cooler out of the diverter valve through the cooled melt outlet line.

25. A heat exchanger and valving system for an underwater pelletizer, comprising:

a heat exchanger that exchanges heat with a polymeric fluid, including an exchanger inlet line that conveys the fluid to the exchanger, and an exchanger outlet line that conveys the fluid from the exchanger; and a diverter valve configured to convey the fluid to and from the exchanger during a heat exchange mode of operation, to convey the fluid around the exchanger during a bypass mode of operation, and to drain the fluid from the exchanger and from the diverter valve during a drain mode of operation, the diverter valve including a first and a second positionable valve component each (i) having a plurality of sets of flow channels therein and (ii) being independently positionable so as to effect separately and independently the heat exchange mode of operation, the bypass mode of operation, and the drain mode of operation.

26. The heat exchanger and valving system according to claim 25, wherein the diverter valve includes a melt inlet line, a melt outlet line to the heat exchanger, a melt bypass line, a heat exchanged melt inlet line from the heat exchanger, a heat exchanged melt outlet line, and a melt drain line.

27. The heat exchanger and valving system according to claim 25, wherein the heat exchanger is configured to cool or heat the melt.

28. The valving system according to claim 22, wherein the first and second positionable valve components are each a bolt that is actuated by a fluid controlled cylinder.

29. The valving system according to claim 28, wherein the fluid controlled cylinder is a hydraulic cylinder or a pneumatic cylinder.

30. The melt cooler and valving system according to claim 1, wherein the first positionable valve component is an actuatable bolt having three sets of the flow channels therein, and the second positionable valve component is an actuatable bolt having at least two sets of the flow channels therein.

31. The melt cooler and valving system according to claim 30, wherein the first and second positionable valve components are each a bolt that is actuated by a fluid controlled cylinder.

32. The melt cooler and valving system according to claim 31, wherein the fluid controlled cylinder is a hydraulic cylinder or a pneumatic cylinder.

* * * * *